United States Patent
DeSantis

(10) Patent No.: US 6,174,349 B1
(45) Date of Patent: Jan. 16, 2001

(54) CONTINUOUS EFFLUENT GAS SCRUBBER SYSTEM AND METHOD

(75) Inventor: Gennaro Nicholas DeSantis, Woodland, WA (US)

(73) Assignee: SEH America, Inc., Vancouver, WA (US)

(*) Notice: Under 35 U.S.C. 154(b), the term of this patent shall be extended for 0 days.

(21) Appl. No.: 09/286,735

(22) Filed: Apr. 6, 1999

(51) Int. Cl.[7] .................................................. B01D 47/00
(52) U.S. Cl. .............................. 95/205; 55/481; 55/506; 95/214; 95/230; 96/236; 96/361; 422/170; 422/177; 423/210; 423/347
(58) Field of Search ..................... 55/506, 481; 96/361, 96/363, 364, 236; 95/230, 234, 214, 197, 205; 422/170, 177; 423/210, 347

(56) References Cited

U.S. PATENT DOCUMENTS

| | | |
|---|---|---|
| 3,823,532 * | 7/1974 | Cooper et al. ................. 55/481 |
| 4,130,632 * | 12/1978 | Braunsperger et al. ........ 55/490.2 |
| 4,198,221 * | 4/1980 | Catlin et al. .................. 55/481 |
| 4,251,245 * | 2/1981 | Reynolds ....................... 55/481 |
| 4,519,999 * | 5/1985 | Coleman et al. ............... 95/214 |
| 4,941,893 | 7/1990 | Hsieh et al. . |
| 5,066,472 | 11/1991 | Ruff et al. . |
| 5,069,686 | 12/1991 | Baker et al. . |
| 5,080,804 | 1/1992 | Ruff . |
| 5,118,486 | 6/1992 | Burgie et al. . |
| 5,131,927 | 7/1992 | Bikson et al. . |
| 5,182,095 | 1/1993 | Ruff et al. . |
| 5,246,682 | 9/1993 | Ruff et al. . |
| 5,252,307 | 10/1993 | Ruff . |
| 5,295,448 | 3/1994 | Vickery . |
| 5,417,934 * | 5/1995 | Smith et al. .................. 423/177 |
| 5,429,662 | 7/1995 | Fillet . |
| 5,503,657 | 4/1996 | Bouard et al. . |
| 5,785,929 * | 7/1998 | Kim et al. .................... 423/171 |
| 5,788,747 | 8/1998 | Horiuchi et al. . |
| 5,858,065 | 1/1999 | Li et al. . |
| 5,858,066 | 1/1999 | O'Brien et al. . |
| 5,961,695 * | 10/1999 | Hasegawa et al. ............. 95/230 |

FOREIGN PATENT DOCUMENTS

748901 * 5/1956 (GB) ................................ 55/481

* cited by examiner

*Primary Examiner*—Duane S. Smith
(74) *Attorney, Agent, or Firm*—Alston & Bird LLP

(57) ABSTRACT

A method and apparatus is provided which continuously filters scrubbed gases prior to emission to the atmosphere. In particular, the method and apparatus can continuously scrub the effluent stream from a chemical vapor deposition process, such as the process used to deposit epitaxial silicon. In order to provide this continuous scrubbing, a separation housing having a filter housing is provided that permits the filter to be replaced during and without interruption of the scrubbing and filtering process. The filter housing can define a pair of tracks that guide the insertion and removal of a filter such that inserting a clean filter into one end of the pair of tracks causes a spent filter to be pushed out of the opposed end of the tracks as the clean filter is slid down the tracks.

41 Claims, 5 Drawing Sheets

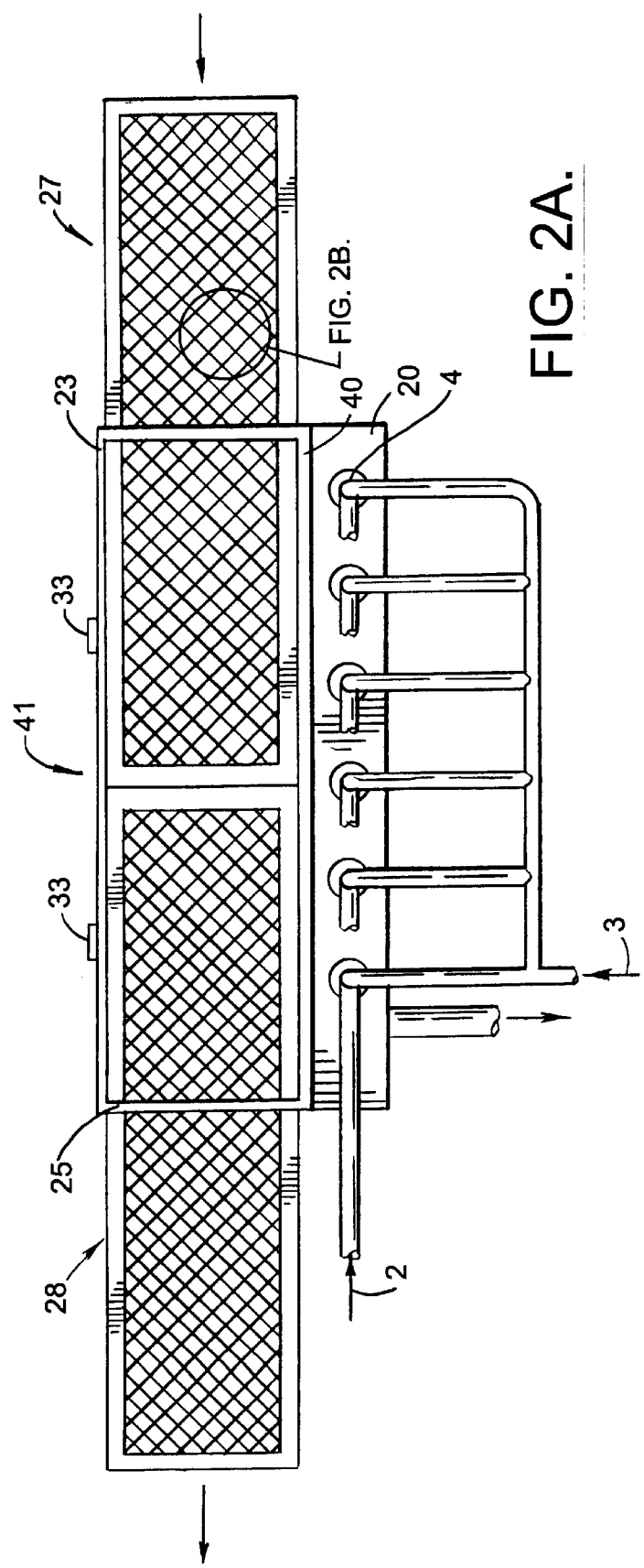

CONTINUOUS EFFLUENT GAS SCRUBBER SYSTEM AND METHOD

FIELD OF THE INVENTION

This invention pertains to the field of gas separation, and more particularly, gas separation by wet scrubbing. One advantageous embodiment of the present invention further relates to the separation of gaseous components which are frequently present in the effluent stream produced during the manufacture of silicon wafers.

BACKGROUND OF THE INVENTION

Vapor deposition processes are used to deposit compounds in a gas phase onto the surface of a solid substrate. Vapor deposition processes are widely used, and can generally be classified into two groups: chemical and physical. In chemical vapor deposition (CVD), reactants in the gas phase flow over a heated substrate and react at or near the surface of the substrate, thereby depositing a film. These carrier gases are commonly employed to dilute the gaseous reactants used in CVD, many of which are toxic or otherwise hazardous.

CVD is used in the deposition of both the polycrystalline and epitaxial silicon layers upon a silicon wafer. Silane, silicon tetrachloride, trichlorosilane, and/or dichlorosilane gases are typical gas phase reactants used to produce these silicon layers. In particular, it is known that a layer of polycrystalline silicon may be deposited from pure silane in the gas phase using low pressure CVD. Typically, the layer of polycrystalline silicon is deposited upon the back side of the wafer to serve a gettering function. In addition, silane gas may also be used in the atmospheric pressure CVD of silicon dioxide upon a silicon wafer from a gaseous mixture containing silane, thereby effectively sealing the back side of the wafer and significantly reducing autodoping.

Excess gas phase reactant remains in the CVD system subsequent to its reaction with the substrate, as is common in many types of chemical reactions. This excess reactant, typically a mixture of one of more silicon compounds in a carrier gas, is removed from the deposition chamber via an exhaust system. In one particular example, an effluent stream produced by the CVD of elemental silicon contains silicon hydrides, namely silanes and disilanes, as well as finely dispersed particulate silicon.

CVD exhaust systems are typically designed to vent treated effluent process streams to the atmosphere. Therefore, the presence of either silane or disilane gases in the CVD effluent stream is especially problematic, as both of these gases are pyrophoric. Due to their hazardous properties, silanes and disilanes can not be released directly into the atmosphere. Therefore, any silanes and disilanes remaining in the exhaust gas must be reacted in order to remove them from the CVD effluent stream prior to its emission to the air. At present, several techniques exist to remove gaseous hydrides such as silane from a gaseous mixture. These techniques include processes by which silane is either filtered from the gas stream or converted into compounds which are suitable for disposal in the environment. Typical methods include the use of semi-permeable membranes, thermal methods such as pyrolysis and oxidation, and wet scrubbing. Currently, each CVD line typically has a dedicated exhaust system for processing effluent gases using a combination of such methods.

Semi-permeable membranes are available to filter silane gas from a mixture of gases. Such membranes are primarily used to purify the silane gas for reuse in the deposition reaction. Semi-permeable membranes are discussed in U.S. Pat. Nos. 5,503,657; 5,131,927 and 4,941,893 and are well known in the art.

Thermal pyrolysis converts silane into polycrystalline silicon and hydrogen gas by treating the CVD effluent gas in a furnace. Furnaces are likewise known for use in thermal oxidation used to produce silicon dioxide from silane. However, neither thermal pyrolysis or oxidation is capable of completely converting all the silane contained in the effluent stream. Therefore, a second separation apparatus must be used to remove residual silane from the furnace's effluent stream prior to its emission to the atmosphere. One method for removing the residual silane is to convert the silane into silicon dioxide, either by a secondary thermal oxidation process or wet scrubbing. The silicon dioxide, a chemically inert material, may then readily be disposed of in the environment.

Thermal oxidation involves the combustion of a gaseous mixture containing silane. A common secondary thermal oxidation technique is the use of "burn boxes," in which a combustible gas is introduced into the gaseous stream and ignited. Alternatively, if the carrier gas employed is flammable, such as hydrogen, the effluent from the primary separation apparatus may simply be flared following initial separation. However, as with all combustion reactions, these methods generate unwanted by products, such as $NO_x$ and $CO_2$.

In wet scrubbing, a chemical reaction is induced between the residual silane and water, thereby forming silicon dioxide. Wet scrubbing is advantageous since wet scrubbing does not produce the harmful byproducts generated during combustion reactions. Wet scrubber systems are well known in the art for removing materials from a gaseous stream. In general, wet scrubber systems remove deleterious materials from gaseous mixtures by bringing the gas mixture into intimate contact with a scrubbing liquid. The scrubbing liquid is chosen so as to dissolve or react with the deleterious component, thus removing it from the gas mixture. Following intimate contact, the scrubbed gas is allowed to escape from the spent scrubbing liquid. Subsequently, the scrubbed gas is filtered to remove any particulates entrained in the gas stream. Several means are available by which to provide contact between the liquid and the gas, including jet pumps and spray nozzles.

Wet scrubbers are known in the art to remove residual silane from an effluent gas stream. Further, it is known to contact a gaseous mixture containing silane with water in a wet scrubber by means of a jet pump. Such wet scrubber units consist of a jet pump attached to the top of a housing in which the gas is allowed to separate from the water. Spent water collects in the bottom portion of the housing, while the scrubbed gas mixture fills the headspace above the spent water. A gas outlet port at the top of the housing allows the scrubbed gas to eventually escape to the atmosphere.

The silicon dioxide produced during the wet scrubbing process is in the form of fine particulates, a portion of which is entrained by the scrubbed gas mixture during the separation process, the remainder of which remains in solution in the water. The silicon dioxide may be removed from the spent water by simply allowing it to settle out of solution, or any other method known in the art, and thereafter disposed of safely as an inert solid waste. However, although chemically inert, the fine particulates entrained in the scrubbed gas may present an inhalation hazard. Therefore, the scrubbed gas mixture is generally filtered prior to its release to the atmosphere to avoid emission of these fine particulates into the atmosphere. At present, this filtration step introduces severe manufacturing inefficiencies into the entire CVD process.

Currently, scrubbed gas is passed through filtration media which has been inserted into the gas outlet port at the top of the separation housing. This filtration media consists of layers of wire mesh, cut to equal size, which have been stacked one on top of another in parallel. A stack of such layers of filter media is held together by metal rods which run perpendicular to the individual layers through pre-cut holes provided in each filter, thus forming a filter pack. This filter pack is secured to the top of the separation housing by bolts or screws. Once in place, the filter pack occupies the entire gas outlet port, extending vertically down into the headspace of the separation housing. Typically, the filter pack is quite thick, such as about 18 to 20 inches in most instances.

To change out filter packs when they become clogged, the entire wet scrubber unit must be shut down to prevent particulates from entering the airstream during the changeover process. More importantly, when the wet scrubber unit is shut down, the CVD line to which the wet scrubber unit is dedicated must be shut down, as well. Changing spent filtration media is further a time consuming process. To change out filter packs, the spent filter pack is loosened from the top of the separation housing. The spent filter pack is then lifted vertically out of the gas outlet port, which remains uncovered until such a time as a fresh filter pack is inserted. Only after securing the fresh filter pack into place may the CVD line and dedicated scrubber resume operation. Filters are typically changed on a monthly basis, and the procedure can be quite lengthy. This down time yields significant production losses. As a result of this loss of production incurred during filter change, each CVD line typically has an individual scrubber dedicated to it, thereby requiring only a single CVD line to be shut down while the filter is being changed but significantly increasing capital costs.

SUMMARY OF THE INVENTION

In one advantageous embodiment, the invention provides a system and method by which the effluent stream from a manufacturing process is first treated in an initial separation apparatus to remove a substantial portion of a deleterious gas present in the effluent gas stream, and is subsequently subjected to a second separation apparatus in which the residual deleterious gas remaining in the treated gaseous mixture is removed by scrubbing with a liquid with the scrubbed gaseous mixture being vented after passing through a filter that can advantageously be changed without interrupting the filtering process due to the configuration of the filter housing in which the filter resides. As such, the system and method of the present invention can continuously scrub residual silane from a CVD effluent stream while permitting filter changes to be performed without interruption to the manufacturing process or the scrubbing process.

The instant invention generally provides a system and method by which a spent filter may be slidably removed by inserting a clean filter into one end of the pair of tracks defined by the filter housing and thereafter pushing the spent filter out of the opposed end of the pair of tracks as the clean filter is slid down the tracks, thereby permitting continuous filtration while replacing the spent filter. The tracks are generally provided by a pair of L-shaped members, mounted in parallel to the top of the separation housing, proximate the gas outlet port defined by the separation housing. In one preferred embodiment, the filter housing comprises two such pairs of L-shaped members, mounted in parallel, vertically opposed to one another. In one particular aspect of the preferred embodiment, means, such as a latch, is provided for securing the filter housing once the filter is in place. A spring member can also be provided which biases the frame members open if the latch is disengaged. In yet another embodiment, the filter housing defines a second track vertically disposed above the first track, thereby providing space for two stacked filters.

Another aspect of the invention is to provide a filter which enables filter changes to take place without process interruptions. The filter is generally formed of wire mesh. In one preferred embodiment, this wire mesh filter is formed of stainless steel, has a porosity of approximately 3 microns, and a thickness of no more than 3 inches. In a preferred embodiment, this wire mesh filter has a laminate structure. In a further aspect of this preferred embodiment, this laminate structure is formed by sandwiching a layer of wire mesh between two layers of wire screen. The filter can also include a frame that captures the edges of the filter media.

By providing continuous filtration during the process of replacing the filter, the system and method of the present invention permits the scrubbing process and, more importantly, the upstream manufacturing process, such as a CVD process, to proceed uninterrupted while the filter is replaced. As such, the system and method of the present invention increases the efficiency of the manufacturing process by permitting continuous operation. Since the scrubbing process need not be shut down to replace the filter, the exhaust of multiple CVD lines can be routed to the same scrubbing system, thereby decreasing the attendant capital costs.

Further understanding of the processes and systems of the invention will be understood with reference to the brief description of the drawings and detailed description which follows herein.

BRIEF DESCRIPTION OF THE DRAWINGS

FIG. 2A is a plan view of a filter as it is being replaced in accordance with one embodiment of the present invention.

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiments set forth herein; rather, this embodiment is provided so that this disclosure will be thorough and complete and will fully convey the scope of the invention to those skilled in the art. Like numbers refer to like elements throughout.

Figure 1:
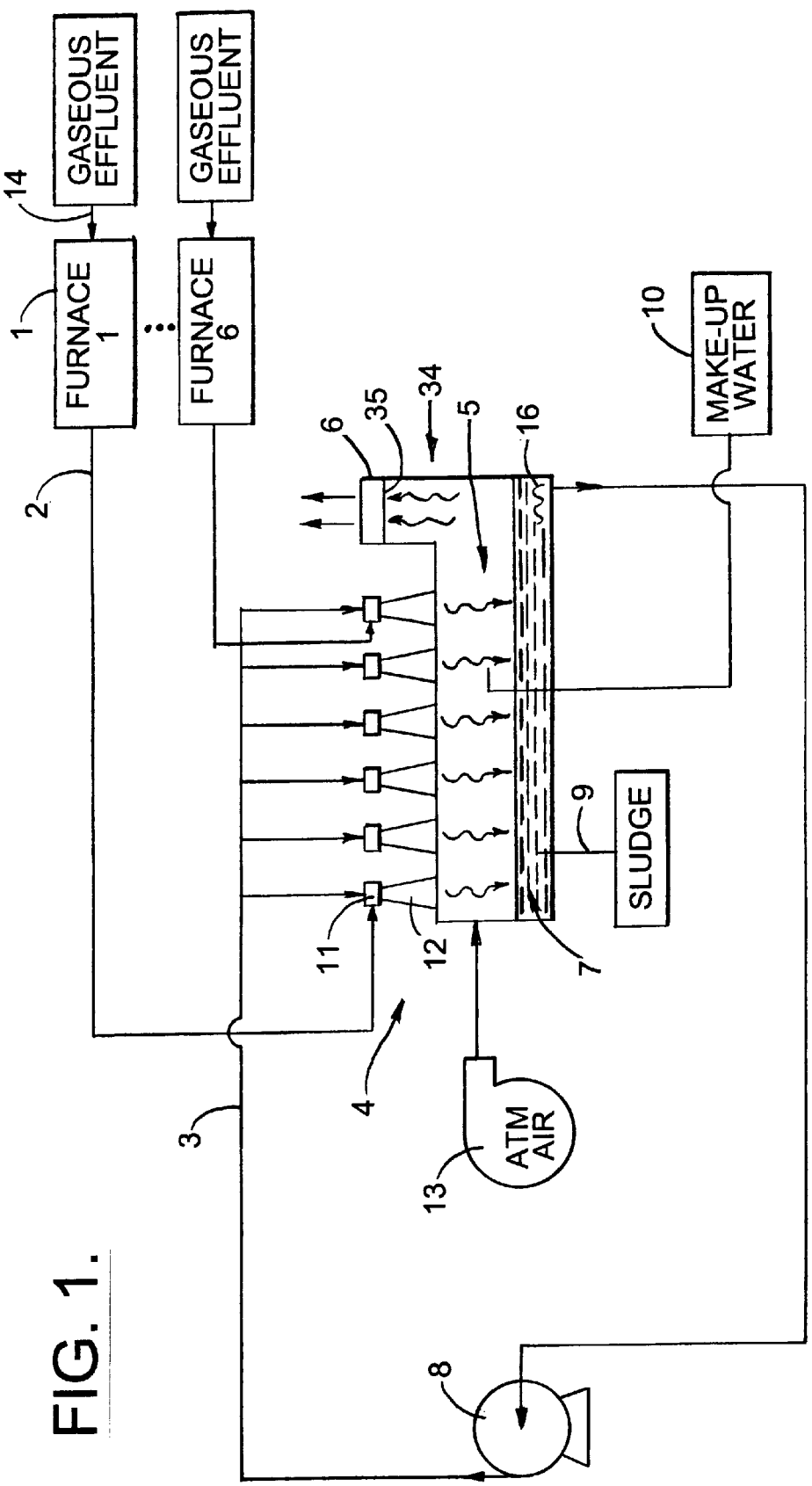
FIG. 1 represents a schematic drawing of a chemical vapor deposition process exhaust system according to one embodiment of the present invention.

Referring now to FIG. 1, a gas scrubbing system is provided. The system receives a gas feed stream 14 that could be generated by any number of manufacturing processes which produce a gaseous effluent stream which must be scrubbed. In one preferred embodiment of the present invention, the gas feed stream is provided by a chemical vapor deposition process, such as a chemical vapor deposition process which deposits an epitaxial layer of silicon upon a silicon wafer. Both low pressure and ambient pressure deposition processes are known in the art for the deposition of epitaxial layers of silicon, and gas feed streams from both of these methods as well as from other manufacturing processes are included within the scope of this invention.

The gas feed stream may contain a wide variety of gaseous constituents, and is commonly comprised of a mixture of carrier gas and reactive gases. Common carrier gases include nitrogen and hydrogen. Common reactive gases include gases such as silane, silicon tetrachloride, trichlorosilane, and/or dichlorosilane. In an especially preferred embodiment, the gas feed stream contains a mixture of nitrogen, oxygen, and silane. In an alternative preferred embodiment, the gas feed stream consists of pure silane. It is generally known that these reactive gases pose an environmental concern and can not be emitted to the atmosphere. Therefore, these deleterious reactive gases must be removed from the carrier gas stream before the carrier gases can be released into the atmosphere.

It is known in the art that stripping processes may be required to remove a reactive gas, such as silane, from a gas feed stream. Although the system and method of the present invention can be utilized in conjunction with a variety of stripping processes, the initial separation apparatus of one embodiment of the present invention is a furnace 1. Furnaces decompose the incoming gas by subjecting it to elevated temperatures, on the order of 600 to 800° C. In particular, furnaces are known to decompose, or pyrolyze, silane gas into elemental silicon and hydrogen. However, such furnaces are not completely efficient, and residual silane remains in the furnace outlet stream 2. This residual silane must be removed by means of a second separation apparatus, such as a wet scrubbing process.

The gas scrubbing system of the present invention therefore also includes a second separation apparatus comprised of a wet scrubbing system. The wet scrubbing system consists of a scrubber 4, a separation housing 34, and a filter 6, through which the scrubbed gas exits the system. Wet scrubbers separate deleterious gases from gas streams by contacting the gas to be cleaned with a scrubbing liquid. In a preferred embodiment, water is used to scrub silane gas out of a gaseous mixture, thereby forming silicon dioxide particulates.

In one embodiment of the present invention, the scrubber 4 employed is a jet pump. Such jet pumps are known in the art and are generally comprised of an aspiration section 11 which feeds into an orifice section 12. Scrubbing liquid 3, such as water, is fed into the top of the aspiration section 11 and flows through a primary channel. In a preferred embodiment, the scrubbing liquid flows through a flow meter prior to entering the jet pump in order to provide a constant motive force. For example, the flow meter may be a variable, adjustable flow meter so as to provide control over the flow rate within the line. The furnace outlet stream 2 feeds into the side of the aspiration section 11 into a secondary channel, which thereafter feeds at an angle into the primary channel. The flow of the scrubbing liquid through the primary channel creates a vacuum on the secondary channel, thereby entraining the gas contained within the secondary channel into the scrubbing liquid. The purpose of this aspiration section 11 is to provide intimate contact between the liquid and gas phases. The jet pump orifice section 12 provides an increased channel diameter through which the scrubbing liquid and entrained gas flows. The purpose of the orifice section 12 is to provide a pressure drop to increase fluid flow within the aspiration section, thereby increasing the available vacuum and providing improved contact between the phases. While a jet pump is common employed as a scrubber, any device providing sufficient intimate contact between the liquid and gas phases may be used as a scrubber. For example, scrubbing devices having open chambers in which a nozzle sprays scrubbing liquid onto a gas stream containing deleterious gas, or any other device known to one skilled in the art, may be employed.

In one embodiment of the present invention, water is employed as the scrubbing liquid. A typical water flow rate into the jet pump is 20 to 30 gallons per minute, preferably 21 gallons per minute, in order to scrub gas that is fed into the jet pump at 40 to 60 cubic feet per minute and, more preferably, 41 cubic feet per minute.

Upon exiting the scrubber, spent scrubbing liquid 7 and scrubbed gas is fed into the separation housing 34. The separation housing allows the scrubbed gas to escape from the spent scrubbing liquid 7. While the separation housing can have any shape, the separation housing can be a roughly rectangular metal vessel into which the exiting scrubber stream cascades. Spent scrubbing liquid is collected in the lower portion of the separation housing 34, also referred to as a scrubber trough, while scrubbed gas occupies the headspace 5 above the spent scrubbing liquid 7. A gas outlet port 35 is provided in the top of the separation housing, thereby allowing the scrubbed gas to exit the system, preferably to the atmosphere.

In a common embodiment, silicon dioxide is formed as a scrubber byproduct. This silicon dioxide is in the form of fine particulates. A significant portion of the silicon dioxide so produced is suspended within the spent scrubbing liquid. However, due to its light weight, a portion of the silicon dioxide is entrained by the scrubbed gas, as well. In order to remove the entrained particulates, the scrubbed gas exiting the system is passed through a filter 6.

In the embodiment shown, the scrubbing liquid is recycled within the system. To purify the spent scrubbing liquid, suspended particulates are removed. In a preferred embodiment, silicon dioxide particulates are removed from the spent scrubbing liquid 7 by allowing the spent scrubbing liquid to reside in the lower portion of the separation housing 34 for a sufficient amount of time for the particulates to settle out. Sludge 9, in the form of a highly concentrated silicon dioxide/water mixture, can therefore be pumped from the bottom of the separation housing on a continuous basis via a liquid sludge removal port defined by the lower portion of the separation housing. A typical flow rate of the sludge, or let down, stream is 1 to 2 gallons per minute, preferably 1 gallon per minute under normal operating conditions for the above-described embodiment. In one embodiment, make up water 10 is provided to the separation housing via a make up liquid port defined in the upper portion of the separation housing. For example, fresh water can be pumped into the separation housing, such as at a rate of 1 to 2 gallons per minute, preferably 1 gallon per minute.

Once the silicon dioxide particulates have settled out of the spent scrubbing liquid, the resulting purified scrubbing liquid is generally recirculated to the scrubber. As such, the second separation apparatus can include a circulation pump 8 to transport the purified scrubbing liquid back to the scrubber. In one embodiment, the circulation pump 8 is a variable speed pump. In this embodiment, outlet streams from additional initial separation apparatuses can easily be scrubbed by a given second separation apparatus unit by merely increasing the circulation pump speed. A flow meter may optionally be provided to determine the amount of make up water 10 which is being provided.

The second separation apparatus can optionally include a fan 13 to supply fresh air to the scrubbed gas occupying the separation housing headspace. The purpose of the fan is to dilute any residual silane potentially remaining in the scrubbed gas to below its pyrophoric limit, thereby allowing the diluted scrubbed gas to be emitted to the atmosphere. The fan 13 maintains a face velocity of at least 150 to 200 feet per minute across the filter 6. In addition, such fans typically supply from 500 to 1000 cubic feet per minute of fresh air, preferably supplying 500 cubic feet per minute of fresh air. Further, the second separation apparatus can include a closed loop heater 16 to keep the scrubbing liquid above its freezing point. Additionally, the second separation apparatus can include other control systems, such as a control loop for maintaining a constant level of spent scrubbing liquid in the separation housing and/or a pressure sensor across the filter 6 to indicate the pressure drop incurred as the scrubbed gas passes through the filtration media.

While the second separation apparatus, i.e., the wet scrubber, can be dedicated to a single furnace, the second separation apparatus can advantageously receive the exhaust from a plurality of furnaces, as is illustrated in FIG. 1. Accordingly, the capital costs of the resulting gas scrubbing system are correspondingly reduced relative to conventional gas scrubbing systems having separate wet scrubbers dedicated to each furnace.

Figure 2B:
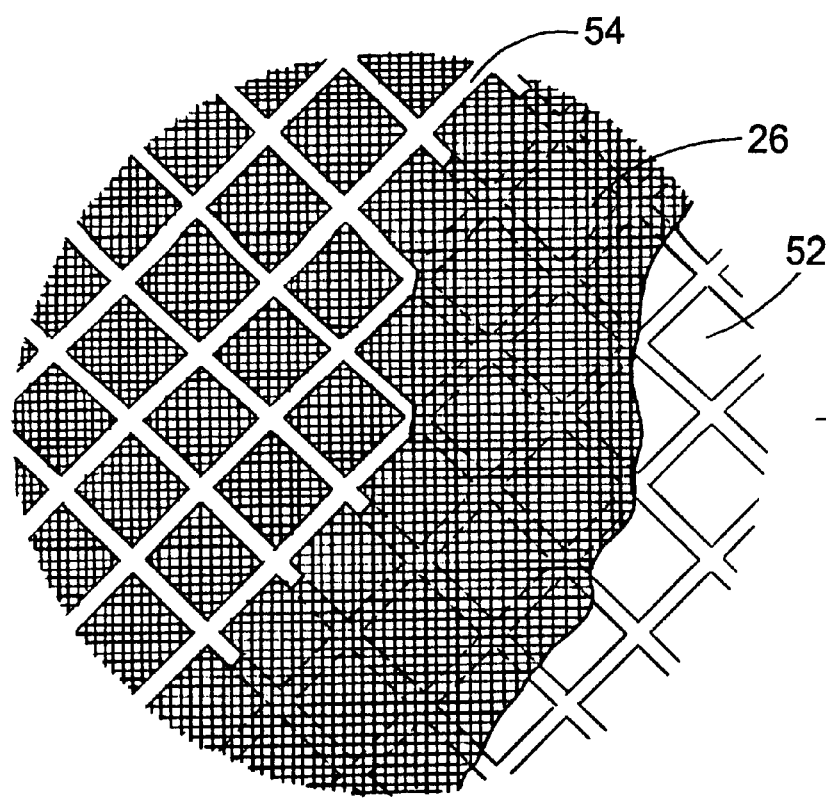
FIG. 2B is a fragmentary plan view of a filter.

According to the present invention, the second separation apparatus advantageously includes a filter housing 41 for securing the filter 6 over the gas outlet port 35 and for facilitating replacement of the filter without interrupting the filtration process. In this regard, FIGS. 2A and 2B provide a plan view of the wet scrubber apparatus of one embodiment during filter removal. Scrubbers 4, such as jet pump, are mounted to the top of the separation housing via mounting plate 20 for scrubbing the exhaust from a respective furnace. In particular, scrubbing liquid 3 and furnace outlet stream 2 both feed into a scrubber 4. The furnace outlet streams are shown in a fragmentary perspective to provide clarity to the figure. In addition, the filter housing 41, described in detail in FIG. 3, is mounted to the top of the separation housing proximate the gas outlet port such that the filter supported by the filter housing completely covers the gas outlet port 35.

In general, the filter housing 41 provides a pair of tracks, the upper members of which are shown as 23 and 40, along which filters slide as they are being changed out. In specific, the filter housing is configured so that a spent filter can be removed from the wet scrubber as a fresh filter is simultaneously being inserted. As shown, a fresh filter 27 is inserted into one end of the tracks defined by the filter housing 41. The fresh filter is then pushed along the tracks which pushes the spent filter 28 out of the opposed end of the tracks defined by the filter housing 41, here shown as 25. Because the filters abut and therefore remain contiguous during the entire removal procedure, the filtration process continues without interruption due to the filter change.

FIG. 2B illustrates a fragmentary view of the fresh filter 27. In the embodiment provided, the filter has a laminate structure, formed by sandwiching a layer of wire mesh 26 between two layers of metal screen 52 and 54.

Figure 3A:
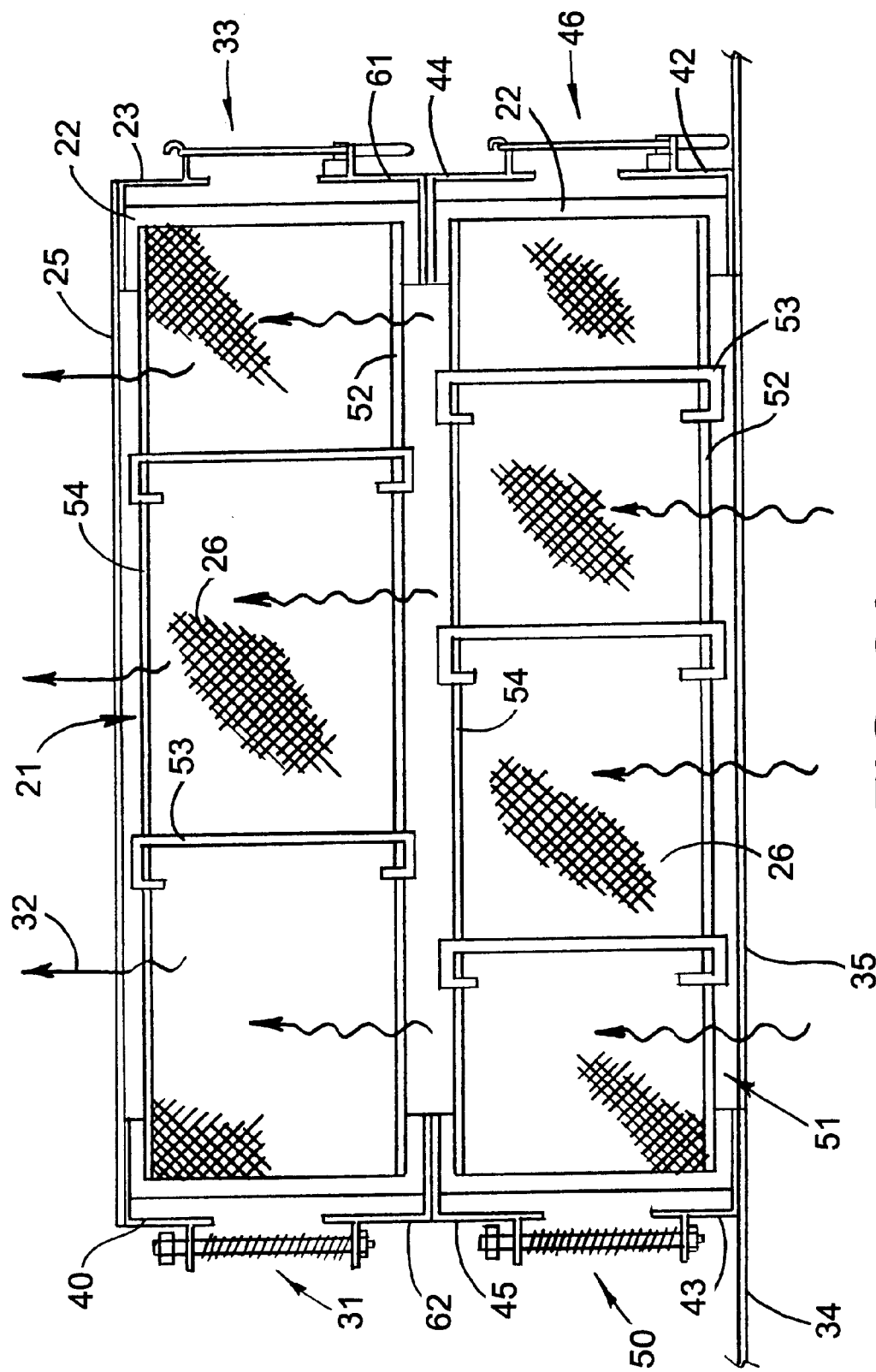
FIG. 3A is a cross sectional view of a filter contained in a filter housing which is in a closed position according to one embodiment of the present invention.
Figure 3B:
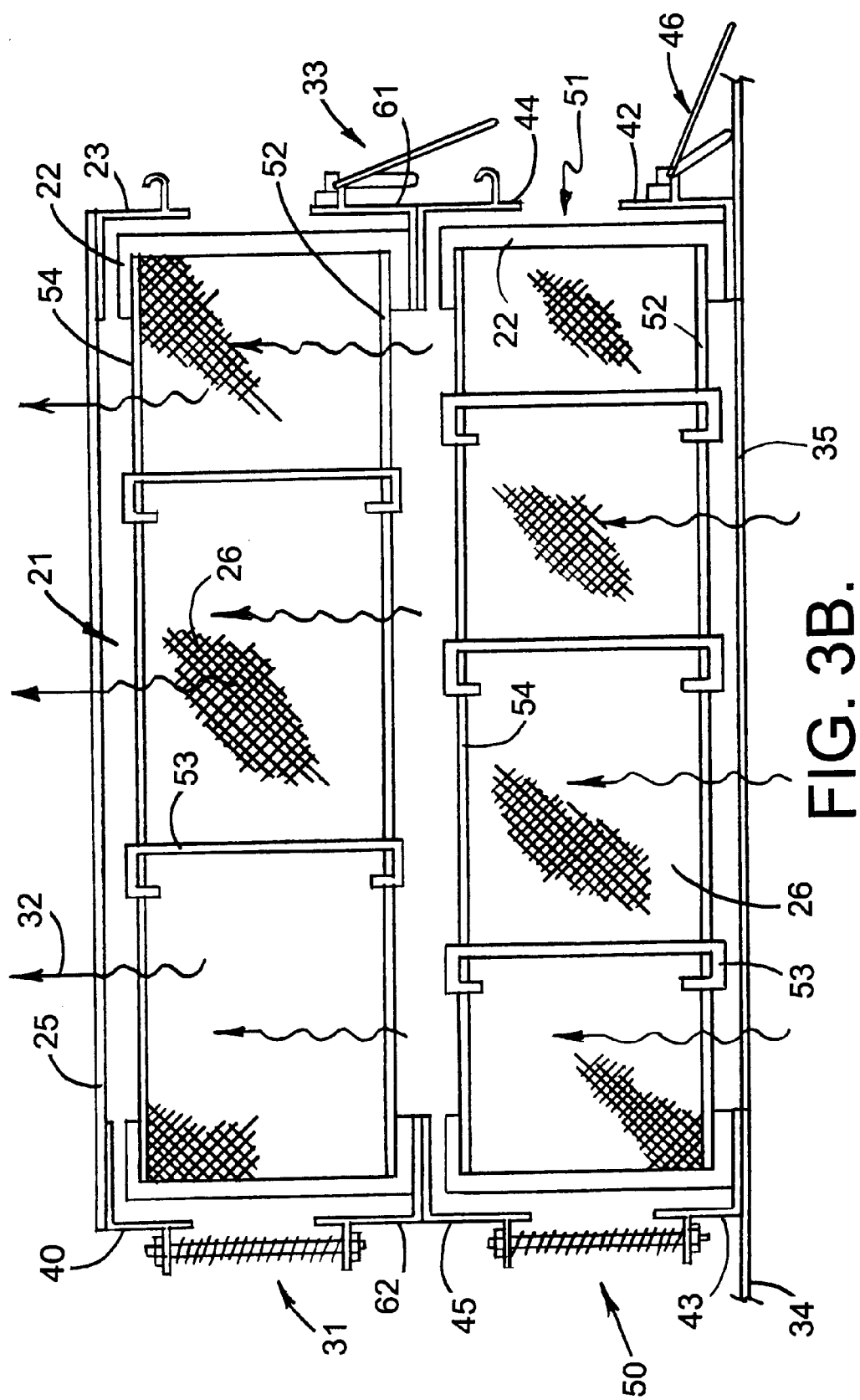
FIG. 3B is a cross sectional view of a filter contained in a filter housing which is in an open position according to one embodiment of the present invention.

FIGS. 3A and 3B provide a detailed cross-sectional view of filters 21 and 51 within the filter housing of one embodiment. In general, the filter housing is a frame consisting of a pair of L-shaped parallel members 42 and 43, which form a pair of tracks. In a preferred embodiment, a second frame, comprised of parallel L-shaped members 44 and 45, is mounted above the first frame to thereby define a space in which the filter will be disposed. The second frame can be mounted above and spaced from the first frame in a variety of manners including the nut and bolt combination shown in FIGS. 3A and 3B which carries a spring mechanism that tends to bias the fist and second frames away from one another as described below. The horizontal distance between the L-shaped members 42 and 43 is, at minimum, the width of the outside edge of the filter frame 22, to ensure sufficient space in which to rest the filter. In no event is the space between the L-shaped members wider than the filter frame 22.

As shown, the filter housing may include means, such as a latch 46, for securing a filter therein by frictionally engaging the filter within the filter housing. Such a filter housing in its secured position is provided in FIG. 3A, while a filter housing in the open, or unsecured, position is provided in FIG. 3B. In this illustrated embodiment, the spring mechanism 50 may bias the frame open when the latch 46 is in its disengaged position, as shown in FIG. 3B, thus facilitating filter replacement.

Although the filter housing need only include a single pair of frames, the filter housing of one embodiment includes a third set of L-shaped frame members 61, 62 mounted atop the second frame and, more particularly, mounted atop members 44 and 45, thereby defining a second pair of tracks for receiving and supporting a second filter 21 above a first filter 51.

As described above in conjunction with the first frame 42 and 43, a fourth frame, comprised of parallel L-shaped members 23 and 40, may be mounted above the third frame, to thereby define a space in which a second filter 21 can be disposed. As illustrated, the third and fourth frames may be secured by a means, such as a latch 33, which frictionally engages the second filter 21 within the space defined by the third frame 61, 62 and fourth frame 23, 40. A filter housing capable of supporting two filters is shown in its secured position in FIG. 3A. A filter housing capable of supporting two filters is illustrated in FIG. 3B in its open, or unsecured, position. Further, as provided in FIG. 3B, a spring mechanism 31, may be used to bias the third frame away from the fourth frame when the latch 33 is disengaged.

Optionally, the filter housing can include a member 25, shown as attached in a perpendicular fashion to members 23 and 40, whose purpose is to stabilize the topmost L-shaped members 23 and 40 and/or 44 and 45 should a single filter configuration be desired. The filter housing typically includes a pair of such perpendicular members at the opposed ends of the filter housing as shown in FIG. 2A. However, the filter housing can include any number of perpendicular members which can be spaced along the length of the filter housing, as required.

The filter housing 41 is attached to the top of the separation housing 34, such that the filter supported by the filter housing 41 completely covers the gas outlet port 35. Scrubbed gas contained in the headspace 5 of the separation housing 34 flows up through the filters 51 and 21, respectively. The filters are typically formed from wire mesh 26.

This wire mesh is preferably stainless steel, and most preferably 316 stainless steel. The wire mesh further has a porosity of between 3 to 5 microns, most preferably having a porosity of 3 microns. The filter is preferably in the form a laminate, formed by sandwiching a layer of wire mesh 26 between opposing layers of metal screen 52 and 54. In one particular preferred embodiment, stability is added to a filter having a laminate construction by inserting metal staples 53 through the filter thickness. The resulting filter has a thickness of about 3 inches. In a preferred embodiment, the filter is further defined by a frame 22, typically formed of metal, whose purpose is to bind the ragged edges of the filter media and to ride upon the tracks defined by the filter housing, thereby facilitating frame insertion and removal.

In normal operation, filters are changed as they become clogged, or spent. The pressure drop incurred as scrubbed gas passes through the filtration media may be used to estimate the remaining useful life of the filter. Once the pressure drop becomes too high across a filter, for example 0.5 psi, the filter should be changed out. Referring now to FIG. 2A, a typical filter change procedure for the upper filter in an embodiment in which the filter housing defines space for two filters involves first disengaging the latches 33, which secure the spent filter 28, in place over the gas outlet port 35.

Once disengaged, the spring mechanism 31, causes the fourth frame, comprised of members 40 and 23, to separate from the third frame, comprised of members 62 and 61, thereby allowing the spent filter 28 to be easily moved. A fresh filter 27 is inserted into one end of the filter housing until it abuts the spent filter 28. As illustrated in FIG. 2A, the fresh filter 27 is then pushed further down the pair of tracks which comprise the filter housing, thereby urging the spent filter 28 out of the opposed end of the filter housing. The fresh filter 27 continuously abuts the spent filter 28 during the entire change out procedure. The fresh filter 27 eventually comes to rest over the gas outlet port 35 in the space previously occupied by the spent filter 28. The fresh filter 27 is then secured into position by engaging latches 33. For filter housing embodiments which employ two filters, then one or both filters may be changed. If both filters are to be replaced, they may be changed out either simultaneously or sequentially. A similar procedure is employed when changing filters in an embodiment providing a single filter. Following removal, the spent filter 28 may be cleaned and subsequently reused. Any cleaning procedure known in the art may be employed, including methods such as pressure washing.

By providing continuous filtration throughout the changeover procedure, the system and method of the present invention permits the scrubbing process, and, more importantly, the upstream manufacturing process, such as a CVD process, to continuously operate throughout a filter change. This ability to continuously operate enables a single wet scrubber to treat the effluent streams of multiple manufacturing processes, thereby decreasing overall capital costs.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A gas scrubbing system comprising:
   an initial separation apparatus for treating an effluent gas mixture containing diluent and deleterious gas components; and
   a second separation apparatus for receiving the treated gas mixture from said initial separation apparatus, wherein said treated gas mixture contains residual deleterious gas, and wherein said second separation apparatus comprises:
   a scrubber in which said treated gas mixture containing said residual deleterious gas is contacted with a scrubbing liquid;
   a separation housing having a lower portion in which spent scrubbing liquid is collected and an upper portion in which a scrubbed gas mixture is collected, wherein said separation housing defines a gas outlet port through which said gas mixture is vented to the atmosphere following scrubbing;
   at least one filter covering said gas outlet port for removing entrained particulates from said scrubbed gas mixture immediately prior to its venting said filter further defining a filter layer; and
   a filter housing mounted to said separation housing proximate the gas outlet port, said filter housing defining a pair of tracks for receiving said filter and for permitting said filter to be replaced during and without interruption to the filtering process, wherein the number of filter layers present during filter replacement remains constant.

2. The gas scrubbing system of claim 1, wherein said filter housing further comprises a first frame comprised of a pair of L-shaped members mounted in parallel to said separation housing proximate said gas outlet port so as to form said pair of tracks and to thereby define an opening adapted to receive said filter and to permit said filter to be later removed by sliding along said tracks in such a manner that said second separation apparatus is capable of being continuously operated.

3. The gas scrubbing system of claim 2, wherein said filter housing further comprises a second frame comprised of a pair of L-shaped members mounted in parallel to each other and in a vertically spaced relationship above said first frame, thereby defining a space for receiving said filter.

4. The gas scrubbing system of claim 3, wherein said filter housing further comprises means for securing said filter in position over said gas outlet port.

5. The gas scrubbing system of claim 4, wherein said means for securing comprises a latch for selectively securing said filter by frictionally engaging said filter between said first and second frames.

6. The gas scrubbing system of claim 5, wherein said filter housing further comprises a spring member which biases said second frame away from said first frame when said latch is disengaged, thereby permitting said filter to be slidably inserted and removed.

7. The gas scrubbing system of claim 3, wherein said filter housing further comprises a second pair of first and second frames mounted on the first pair of first and second frames, wherein said second pair of frames cooperate to define a second pair of tracks for receiving another filter.

8. The gas scrubbing system of claim 1, wherein said initial separation apparatus comprises a furnace, and said scrubber comprises a jet pump.

9. The gas scrubbing system of claim 8, wherein said initial separation apparatus comprises a plurality of furnaces that provide treated gas mixtures to said same second separation apparatus.

10. The gas scrubbing system of claim 1, further comprising a pump which recycles purified scrubbing liquid by pumping an upper layer of scrubbing liquid contained in the lower portion of said separation housing into said scrubber.

11. The gas scrubbing system of claim 1, further comprising a fan which provides fresh air to a headspace defined in the upper portion of said separation housing, thereby diluting said scrubbed gas which has been separated from the scrubbing liquid with fresh air prior to filtration and venting.

12. A gas scrubbing system comprising:
 a furnace for initially treating a gas mixture comprising nitrogen, oxygen, and silane; and
 a second separation apparatus for receiving the treated gas mixture from said furnace, wherein said treated gas mixture contains residual silane, and wherein said second separation apparatus comprises:
  a jet pump in which said treated gas mixture containing residual silane is scrubbed with water, thereby inducing a reaction which converts silane gas into silicon dioxide particulates;
  a separation housing having a lower portion in which spent water containing silicon dioxide particulates is collected and an upper portion in which a gas mixture containing nitrogen and oxygen is collected, wherein said separation housing defines a gas outlet port through which said gas mixture is vented following scrubbing;
  a spent framed mesh filter and a fresh framed mesh filter contiguous therewith covering said gas outlet port, said filters for removing entrained silicon dioxide particulates from the scrubbed gas mixture immediately prior to emission to the atmosphere; and
  a filter housing mounted to said separation housing proximate the gas outlet port, said filter housing defining a pair of tracks for receiving said fresh filter and for permitting said spent filter to be replaced during and without interruption to the filtering process;
  wherein said separation housing defines a liquid sludge removal port in the lower portion thereof, through which the silicon dioxide particulates which settle out of the spent water is pumped out in the form of sludge, and wherein said separation housing defines a make up liquid port in the upper portion thereof through which fresh water is pumped into the separation housing.

13. A separation apparatus for treating a gas mixture containing diluent and deleterious gases comprising:
 a scrubber in which said gas mixture containing said deleterious gas is contacted with a scrubbing liquid;
 a separation housing having a lower portion in which spent scrubbing liquid is collected and an upper portion in which a scrubbed gas mixture is collected, wherein said separation housing defines a gas outlet port through which said gas mixture is vented to the atmosphere following scrubbing;
 at least one filter covering said gas outlet port for removing entrained particulates from the scrubbed gas mixture immediately prior to its venting said filter further defining a filter layer; and
 a filter housing mounted to said separation housing proximate the gas outlet port, said filter housing defining a pair of tracks for receiving said filter and for permitting said filter to be replaced during and without interruption to the filtering process, wherein the number of filter layers present during filter replacement remains constant.

14. The separation apparatus of claim 13, wherein said filter housing further comprises a first frame comprised of a pair of L-shaped members mounted in parallel to said separation housing proximate said gas outlet port so as to form said pair of tracks and to thereby define an opening adapted to receive said filter and to permit said filter to be later removed by sliding along said tracks in such a manner that said separation apparatus is capable of being continuously operated.

15. The separation apparatus of claim 14, wherein said filter housing further comprises a second frame comprised of a pair of L-shaped members mounted in parallel to each other and in a vertically spaced relationship above said first frame, thereby defining a space for receiving said filter.

16. The separation apparatus of claim 15, wherein said filter housing further comprises means for securing said filter in position over said gas outlet port.

17. The separation apparatus of claim 16, wherein said means for securing comprises a latch for selectively securing said filter by frictionally engaging said filter between said first and second frames.

18. The separation apparatus of claim 17, wherein said filter housing further comprises a spring member which biases said second frame away from said first frame when said latch is disengaged, thereby permitting said filter to be slidably inserted and removed.

19. The separation apparatus of claim 15, wherein said filter housing further comprises a second pair of first and second frames mounted on the first pair of first and second frames, wherein said second pair of frames cooperate to define a second pair of tracks for receiving another filter.

20. The gas scrubbing system of claim 13, wherein said filter is comprised of wire mesh.

21. The gas scrubbing system of claim 20, wherein said wire mesh filter further comprises stainless steel wire.

22. The gas scrubbing system of claim 20, wherein said wire mesh filter has a porosity of between 3 to 5 microns.

23. The gas scrubbing system of claim 22, wherein said wire mesh filter has a porosity of 3 microns.

24. The gas scrubbing system of claim 20, wherein said wire mesh filter has a thickness of no more than 3 inches.

25. The gas scrubbing system of claim 13, wherein said filter further comprises a laminate structure.

26. The gas scrubbing system of claim 25, wherein said laminate structure further comprises a layer of wire mesh sandwiched between two layers of wire screen.

27. The gas scrubbing system of claim 26, wherein said filter further comprises a frame for capturing edges of the laminate structure.

28. The gas scrubbing system of claim 13, wherein said filter housing facilitates replacement of a spent filter by inserting a clean filter into one end of said pair of tracks and pushing said spent filter out of an opposed end of said pair of tracks as said clean filter is slid down said tracks.

29. A method of scrubbing a gas stream, comprising the steps of:
 introducing an effluent gas mixture containing diluent and deleterious gas components into a first separation process;
 receiving a treated gas mixture from said first separation process, said treated gas mixture containing residual deleterious gas; and
 introducing said treated gas mixture containing residual deleterious gas into a second separation process, said process comprising:
  scrubbing said treated gas mixture containing residual deleterious gas with a scrubbing liquid;

separating the scrubbed gas from the scrubbing liquid;

filtering particulates entrained in the scrubbed gas with at least one layer of filtration media prior to venting said scrubbed gas and following said separating step; and replacing spent filtration media with fresh filtration media during and without interruption to said filtering step and further maintaining a constant number of layers of filtration media during filter replacement.

30. The method of scrubbing a gas stream of claim 29, wherein said replacing step further comprises slidably removing spent filtration media while concurrently slidably inserting fresh filtration media to thereby provide continuous filtration of said scrubbed gas.

31. The method of scrubbing a gas stream of claim 30, further comprising securing said fresh filtration media once in place.

32. The method of scrubbing a gas stream of claim 29, wherein said filtering step comprises passing said scrubbed gas through a wire mesh filter.

33. The method of scrubbing a gas stream of claim 29, wherein said first separation process comprises the step of thermally treating said gas mixture.

34. The method of scrubbing a gas stream of claim 29, wherein said scrubbing step comprises the step of aspirating said treated gas mixture into said scrubbing liquid, thereby chemically reacting said deleterious gas with said scrubbing liquid.

35. The method of scrubbing a gas stream of claim 29, wherein said separating step comprises allowing said scrubbing liquid to cascade into lower portions of a separation housing.

36. The method of scrubbing a gas stream of claim 29, wherein said second separation process further comprises the step of purifying spent scrubbing liquid by allowing particulates trapped in said spent scrubbing liquid to settle out.

37. The method of scrubbing a gas stream of claim 36, further comprising the step of continuously recirculating said scrubbing liquid following said purification step by scrubbing the treated gas mixture with purified scrubbing liquid.

38. The method of scrubbing a gas stream of claim 36, further comprising the steps of ensuring that the spent scrubbing liquid does not freeze during the settling process and that said separation housing maintains a constant level of spent scrubbing liquid during said second separation process.

39. The method of scrubbing a gas stream of claim 29, further comprising the steps of diluting said scrubbed gas with ambient air prior to filtering said scrubbed gas and subsequently venting said filtered, scrubbed gas.

40. The method of scrubbing a gas stream of claim 29, wherein said introducing step comprises introducing said treated gas mixtures from a plurality of first separation processes into the same second separation process.

41. A gas scrubbing system comprising:

an initial separation apparatus for treating an effluent gas mixture containing diluent and deleterious gas components; and a second separation apparatus for receiving the treated gas mixture from said initial separation apparatus, wherein said treated gas mixture contains residual deleterious gas, and wherein said second separation apparatus comprises:

a scrubber in which said treated gas mixture containing said residual deleterious gas is contacted with a scrubbing liquid;

a separation housing having a lower portion in which spent scrubbing liquid is collected and an upper portion in which a scrubbed gas mixture is collected, wherein said separation housing defines a gas outlet port through which said gas mixture is vented following scrubbing;

at least one filter covering said gas outlet port for removing entrained particulates from said scrubbed gas mixture prior to its venting; and a filter housing mounted to said separation housing proximate the gas outlet port, said filter housing defining a pair of continuous tracks extending the length of said gas outlet port, said tracks for receiving said filter and for permitting said filter to be replaced during and without interruption to the filtering process.

\* \* \* \* \*